United States Patent [19]

Hoffman et al.

[11] 4,413,420

[45] Nov. 8, 1983

[54] VEHICLE GEOMETRY CHECKING APPARATUS

[75] Inventors: Ronald E. Hoffman, Uniontown, Ohio; William K. Freed, Memphis, Tenn.

[73] Assignee: The Goodyear Tire & Rubber Company, Akron, Ohio

[21] Appl. No.: 337,218

[22] Filed: Jan. 6, 1982

[51] Int. Cl.³ .................... G01B 5/25; G01B 5/255
[52] U.S. Cl. ............................ 33/180 AT; 33/193; 33/203.17; 33/335
[58] Field of Search ........... 33/158, 180 AT, 181 AT, 33/193, 203, 203.17, 203.2, 203.21, 335, 336, 337, 427, 451, 464

[56] References Cited

U.S. PATENT DOCUMENTS

| 1,804,448 | 5/1931 | Wochner | 33/158 |
| 2,098,749 | 11/1937 | Johnston | 33/203.17 |
| 2,434,205 | 1/1948 | Fields | 33/203.17 |
| 2,542,561 | 2/1951 | Olejniczak | 33/158 |
| 3,460,264 | 8/1969 | Cluchey | 33/203.17 |
| 3,686,770 | 8/1972 | Davis | 33/193 |
| 4,271,599 | 6/1981 | Pavitt | 33/336 |
| 4,366,624 | 1/1983 | Bergstrom | 33/180 AT |

FOREIGN PATENT DOCUMENTS 3712 of 1910 United Kingdom .................. 33/464

OTHER PUBLICATIONS

Reyco, "Suspension Systems and Brake Drums for the Trucking Industry", undated, 3 pages.
Bear, "Wheel Alignment and Balancing Equipment", 1973, pp. 1, 29 and 30.
Bear, "Bear Alignment Racks and Accessories", 1979, pp. 11 and 12.

Primary Examiner—Richard R. Stearns
Attorney, Agent, or Firm—L. R. Drayer

[57] ABSTRACT

A lightweight, collapsible, easily transported apparatus for checking the geometry of a vehicle's frame and axles. The apparatus comprises a pointer bar assembly for use as a trammel and for checking toe measurements of steering axle tires, and an adjustable square bar assembly for providing a reference line perpendicular to a vehicle's frame. In its preferred embodiment, the apparatus is especially well suited for checking the frame and axle alignment of tractors with two or more drive axles, and trailers having two or more axles.

6 Claims, 6 Drawing Figures

VEHICLE GEOMETRY CHECKING APPARATUS

BACKGROUND OF THE INVENTION

The present invention relates to a lightweight, collapsible, easily transported apparatus for checking the geometry of a vehicle's frame and axles. While the preferred embodiment is shown being used to check the vehicle geometry of a tractor/trailer rig, it will be apparent to those skilled in the art that with insignificant alterations the preferred embodiment may be used for checking the vehicle geometry of smaller or larger vehicles also.

A vehicle's frame and axle geometry may be evaluated with regard to parallelism of frame rails and axles, and perpendicularity of axles with regard to frame rails. While the vehicle manufacturers' specifications should be consulted regarding the designed angular relationships of frame members and axles, it will be assumed for the purpose of describing the preferred embodiment of the invention that the frame rails extending from front to rear of a tractor or trailer are designed to be parallel to each other, and that all axles of the tractor and trailer are designed to be parallel to each other and perpendicular to the frame rails. A significant deviation from parallelism or perpendicularity may result in vehicle tracking problems, adversely affecting fuel economy, ride and handling, as well as poor tire wear characteristics.

While various methods and apparatus for checking vehicle geometry have been devised, most rely upon the person doing the checking being able to use a variety of instruments, often designed for other purposes, such as steel squares, straight edges and yard sticks, making measurements of vehicle geometry awkward.

SUMMARY OF THE INVENTION

A primary object of the invention is to provide a lightweight, collapsible, easily transportable apparatus that may be used in a variety of environments for making checks of a vehicle's geometry.

Another object of the invention is to provide a means by which tire dealers may evaluate whether irregular tire wear is a result of defective tires or defective vehicle geometry.

Other features and advantages of the invention will be apparent from the following description when taken in connection with the accompanying drawings.

BRIEF DESCRIPTION OF THE DRAWINGS

One embodiment of the invention is described below with reference to the drawings, in which.

DESCRIPTION OF THE PREFERRED EMBODIMENT

Figure 1:
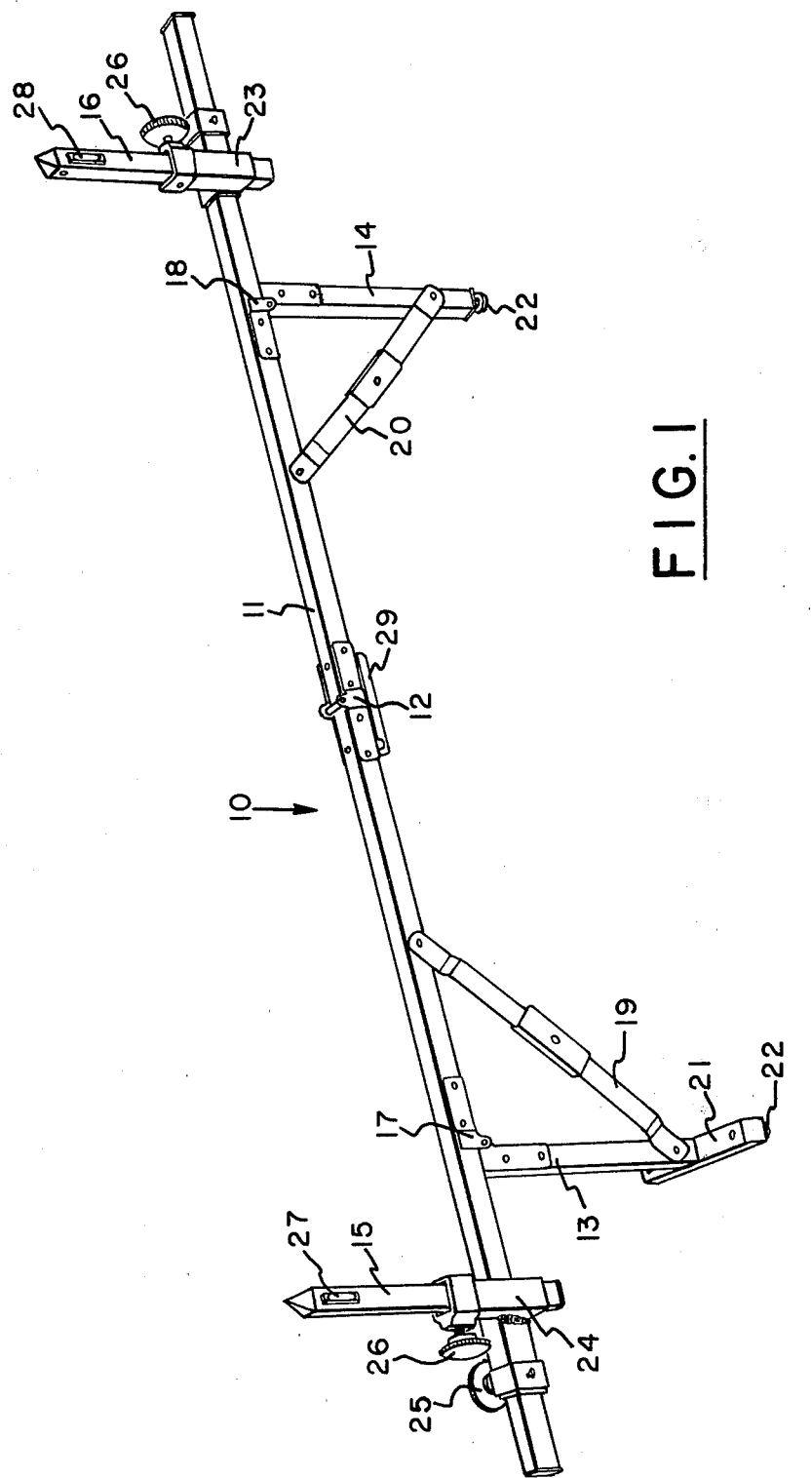
FIG. 1 is a perspective view of the pointer bar assembly, assembled and ready for use.
Figure 2:
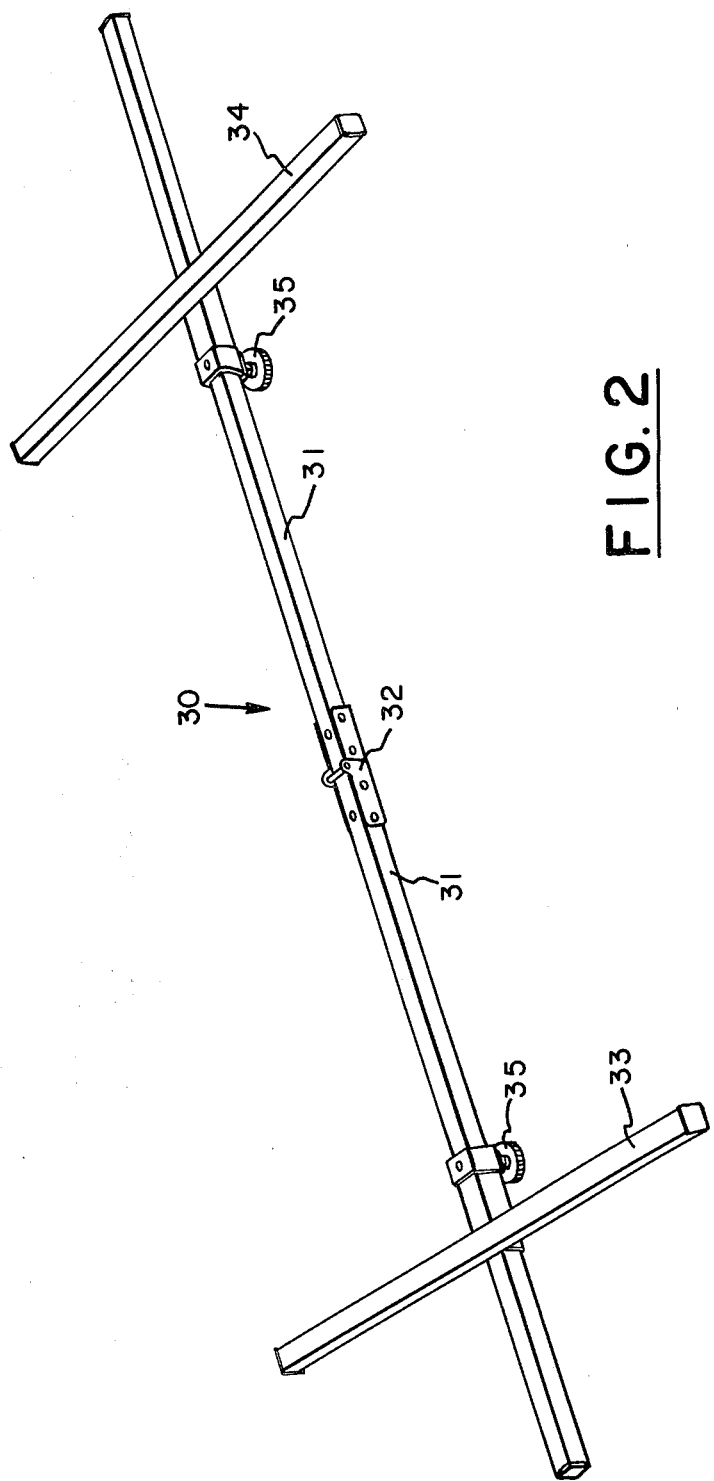
FIG. 2 is a perspective view of the adjustable square bar assembly, assembled and ready for use.

The preferred embodiment of the invention consists of two assemblies which are shown in FIG. 1 and FIG. 2. FIG. 1 is a perspective view of the pointer bar assembly 10 assembled and ready for use. The pointer bar assembly can be used as a trammel for checking the parallelism of axles, or for checking toe measurements of tires on steering axles. The pointer bar assembly 10 consists of a horizontal bar member 11 that is hinged 12 at the center of its length, with collapsing legs 13,14 for vertical support attached thereto and a plurality of pointers 15,16 attached to the horizontal bar member by pointer clamp assemblies 23,24 which allow the pointers to be slid along a portion of the horizontal bar member's length. The collapsible legs 13,14 are attached to the horizontal bar member 11 by hinges 17,18 and collapsible diagonal members 19,20. Either one, or both, of the collapsible legs may be provided with a horizontal base 21 that is perpendicular to the horizontal bar member 11, or a similar means to add stability may be used. Supporting feet 22 may be attached to the ends of the collapsible legs or horizontal base as desired. The pointers 15,16 are held in their operative positions, perpendicular to the horizontal bar member 11, by means of a right pointer clamp assembly 23 and left pointer clamp assembly 24. The pointer clamp assemblies 23,24 are adapted to be slidably mounted upon the horizontal bar member 11 and are secured in desired positions by means of set screws 25. The pointers 15,16 are secured in desired positions in the pointer clamp assemblies 23,24 by means of set screws 26. It should be noted that the pointers 15,16 each have an end that is adapted to fit into the hub center hole of a vehicle wheel by coming to a point.

Each pointer 15,16 is provided with a bubble level 27,28 attached thereto by detachable means. The bubble levels are used to insure that the vehicle being checked is sitting level, so that more reliable measurements can be made.

FIG. 2 is a perspective view of the adjustable square bar assembly 30 assembled and ready for use in providing a reference line perpendicular to a vehicle's frame members. The adjustable square bar assembly 30 consists of a straight bar member 31 hinged 32 at the center of its length, with a plurality of reference bar members 33,34 adapted to be slidably mounted on the straight bar member, with set screws 35 employed to secure the reference bar members in desired locations along the length of the straight bar member.

Figure 3:
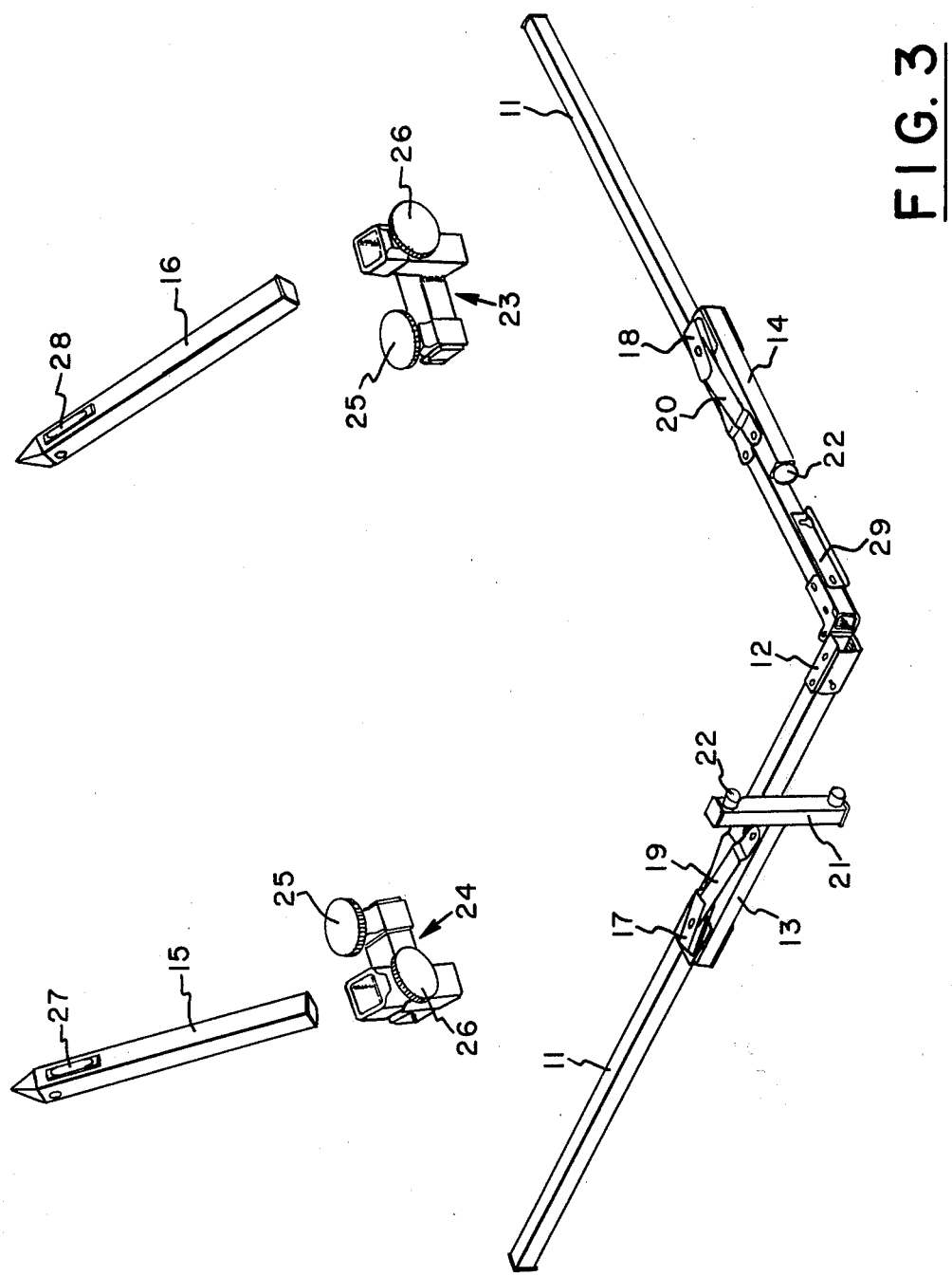
FIG. 3 is a perspective view of the pointer bar assembly, disassembled for storage or transporting.

FIG. 3 is a perspective view of the pointer bar assembly, disassembled for storage or transporting. The pointer bar assembly is collapsed and disassembled by first loosening the set screws 26 that secure the pointers 15,16 in their operative positions and then withdrawing the pointers from the right and left pointer clamp assemblies 23,24. Next, the set screws 25 that secure the right and left pointer clamp assemblies 23,24 in place on the horizontal bar member 11 are loosened and the right and left pointer clamp assemblies 23,24 are slid off of the ends of the horizontal bar member 11. The first collapsible leg 13 and second collapsible leg 14 are then rotated about their respective hinges 17,18 until they are parallel with and adjacent to the horizontal bar member 11. The last step in collapsing the pointer bar assembly is to release the locking means 29 of the hinge 12 located at the midpoint of the length of the horizontal bar member 11, and then fold the horizontal bar member about the hinge so that the two portions of the horizontal bar member are parallel with and adjacent to each other. The pointer bar assembly can be reassembled for use by performing the steps described in reverse order, performing assembly functions when disassembly functions are called for.

Figure 4:
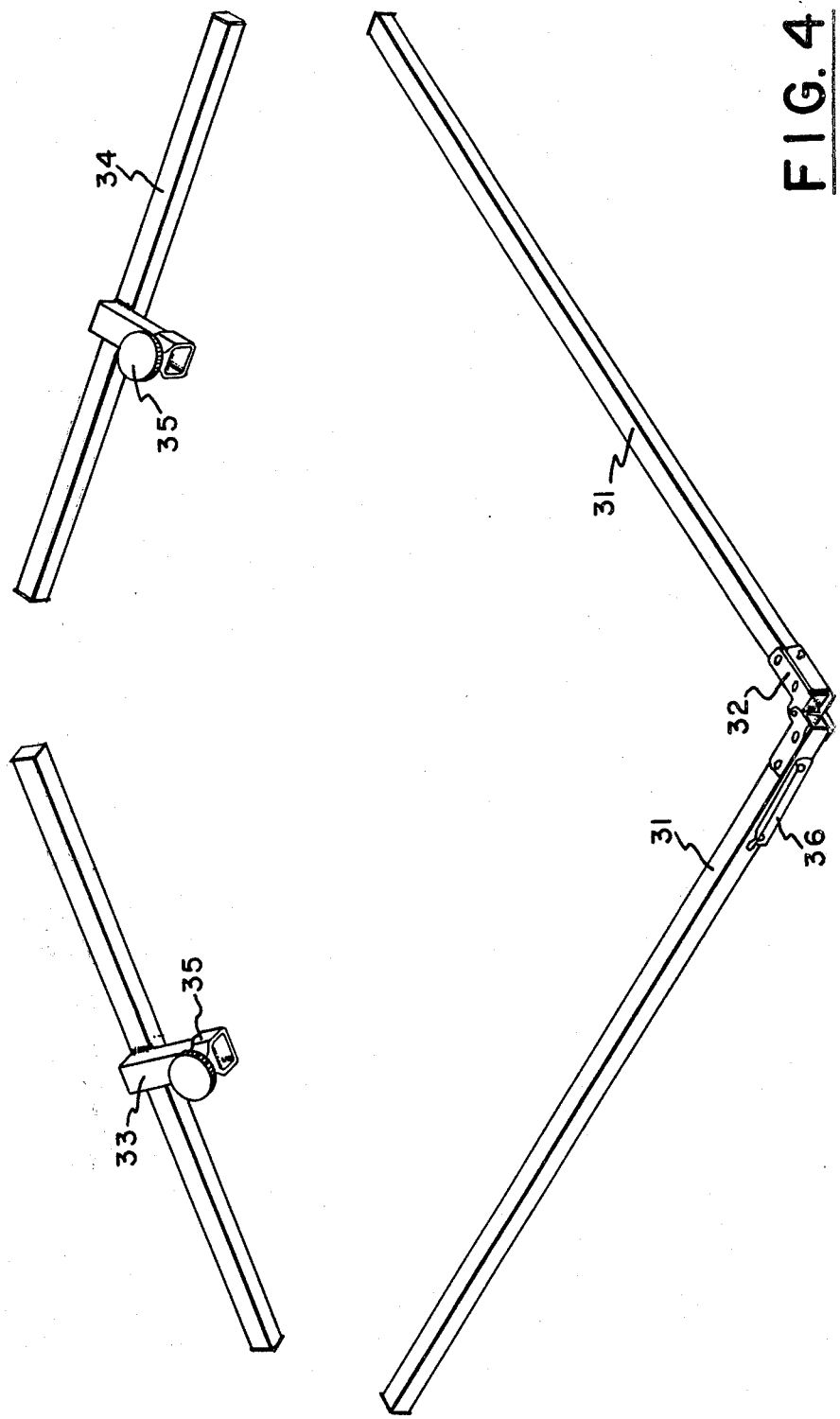
FIG. 4 is a perspective view of the adjustable square bar assembly, disassembled for storage or transporting.

FIG. 4 is a perspective view of the adjustable square bar assembly disassembled for storage or transporting. The adjustable square bar assembly is disassembled by first loosening the set screws 35 that secure the reference bar members 33,34 in place on the straight bar member 31, and then sliding the reference bar members off of the respective ends of the straight bar member. Disassembly is completed by disengaging the locking device 36 that secures the hinge 32 located near the center of the straight bar member 31 in place during the use of the adjustable square bar assembly, and then rotating the portions of the straight bar member about the hinge until the portions are parallel with and adjacent to each other. The adjustable square bar assembly can be reassembled for use by performing the steps described in reverse order, performing assembling functions when disassembling functions are called for.

Figure 5:
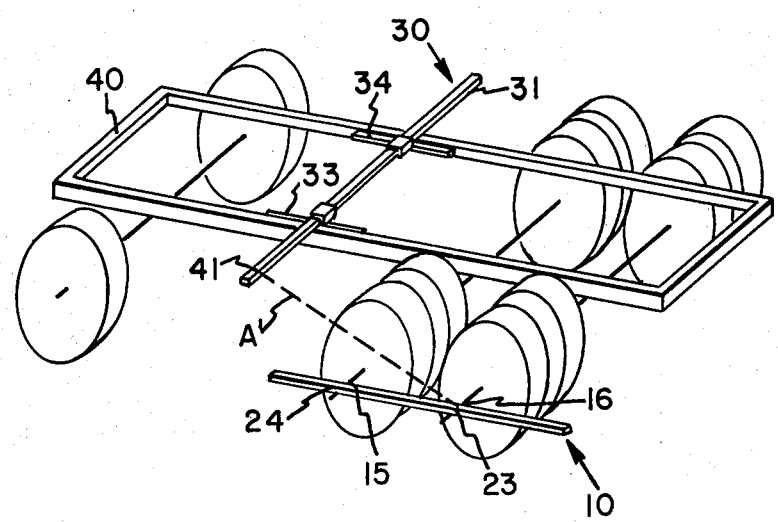
FIG. 5 is a schematic view of the apparatus in its operative position for checking the geometry of a tractor with dual drive axles.

FIG. 5 is a schematic view of the apparatus in its operative position for checking the geometry of a tractor with dual drive axles. Before any measurements can be made, the tractor must be disconnected from the trailer and parked on a level surface. The adjustable square bar assembly 30 is then extended across the front to rear members of the frame 40 of the tractor, ahead of the front drive axle. The straight bar member 31 of the adjustable square bar assembly 30 is then locked in place perpendicular to the tractor's frame members by sliding the reference bar members 33,34 snugly against the inside of the tractor's frame members and then securing the reference bar members in place by tightening the set screws 35. The perpendicularity of the straight bar member 31 with respect to the tractor's frame members may be checked with a steel square and measurements to jig drilled bolt holes in the frame members. Next, a reference point 41 should be marked with a grease pencil on the straight bar member 31 just beyond the outer edge of the outer dual tires on each side of the tractor. The reference point must be an even number of inches, not in fractions of an inch, from the inner side of the tractor's frame member on that side of the tractor, and the distance from the reference point to the inner side of the frame member should be the same on each side of the tractor. While leaving the adjustable square bar assembly in place, the pointers 15,16 of the pointer bar assembly should be placed into the center holes of the two drive axle hubs on one side of the tractor, and locked into position with the bubble levels 27,28 up. Note that on some tractors, a protective cover or hubometer may have to be removed to gain access to the center holes of the axle hubs. The bubble levels attached to the pointers should be checked to make sure that the tractor is sitting level while the checks are being made. A flexible tape measure, held tautly, is then used to measure the distance from the reference point 41 on the straight bar member 31 of the adjustable square bar assembly 30 to the front corner of the pointer clamp assembly 23 holding the pointer 16 that is in the center hole of the rearmost axle hub. This measurement should be recorded as A'. After insuring that the pointer clamp assemblies are locked tightly into position like a trammel, because the distance between the pointers will be compared to the distance between drive axle hubs on the other side of the tractor, the pointer bar assembly 10 should be removed from the drive axle hubs. The distance between the pointers should be measured using a flexible tape, held tautly, and the distance should be recorded as B'. The pointer bar assembly is then transported to the opposite side of the tractor and an attempt is made to place the pointers into the center holes of the two drive axle hubs without moving the pointers. However, if it is necessary to move the pointers to facilitate their insertion into the center holes of the drive axle hubs, the distance between the pointers should again be measured with a tautly held flexible tape and recorded as $B^2$. The distance between the reference point on the straight bar member of the adjustable square bar assembly and the front corner of the pointer clamp assembly holding the pointer that is inserted in the center hole of the rearmost drive axle hub is measured using a tautly held flexible tape and recorded as $A^2$. If the difference between B' and $B^2$ is more than one-quarter inch, the drive axles are not parallel and should be adjusted by a qualified mechanic. If the difference between A' and $A^2$ is greater than one-quarter inch, the rearmost axle is not perpendicular to the frame of the vehicle, and if this condition is not corrected, excessive and premature wear on the front tires and fuel economy may be effected. The aid of a qualified mechanic to adjust axle perpendicularity and parallelism should be sought. The perpendicularity of the forwardmost drive axle may be checked by making measurements similar to A' and $A^2$.

Figure 6:
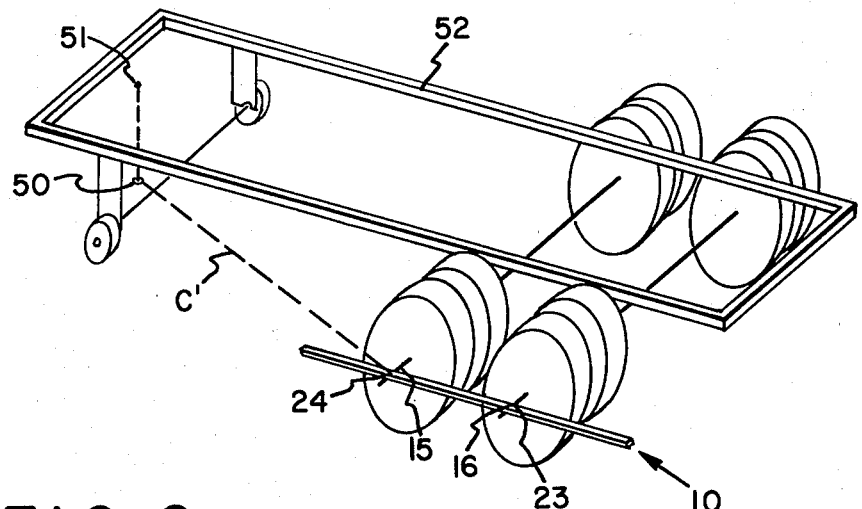
FIG. 6 is a schematic view of the apparatus in its operative position for checking the geometry of a trailer with dual axles.

FIG. 6 is a schematic view of the apparatus in position for checking the geometry of a dual axle trailer. The checks should be made with the trailer frame 52 level. A plumb bob is used to locate a reference point 50 on the floor or ground directly below the trailer's king pin 51. This reference point 50 should be marked for future use. The pointer's 15,16 of the pointer bar assembly 10 are placed in the center holes of the two axle hubs on one side of the trailer, with the bubble levels 27,28 up, and the pointer clamp assemblies 23,24 secured in position by the set screws 25. A flexible tape measure is held tautly to measure the distance from the reference point 50 on the floor or ground to the front corner of the pointer clamp assembly 24 holding the pointer that is inserted in the center hole of the axle hub on the forwardmost axle. This measurement should be recorded as C'. After insuring that the pointer clamp assemblies 23,24 are securely locked in place, so that the pointer bar assembly can be used as a trammel, the pointers should be removed from the center holes of the axle hubs, and the distance between the pointers measured and recorded as D'. The pointer bar assembly 10 should then be transported to the opposite side of the trailer and an attempt made to insert the pointers into the center holes of the axle hubs. If the pointers cannot be inserted into the center holes of the axle hubs without moving them, then the pointer clamp assemblies should be adjusted and locked into place and the distance between the pointers measured once again and recorded as $D^2$. A tautly held flexible tape should then be used to measure the distance from the reference point 50 on the floor or ground to the front corner of the pointer clamp assembly holding the pointer that is inserted into the center hole of the forwardmost axle hub and this distance recorded as $C^2$. If the distance between D' and $D^2$ is greater than one-quarter inch, the axles of the trailer are not parallel and they should be adjusted by a qualified mechanic. If the difference between C' and $C^2$ is greater than one-quarter inch, then the forwardmost axle of the trailer is not perpendicular to the frame 52 of the trailer and this condition should be corrected by a qualified mechanic who can also set all rear axles parallel to the forwardmost axle.

While certain representative embodiments and details have been shown for the purpose of illustrating the invention, it will be apparent to those skilled in the art that various changes and modifications may be made therein without departing from the spirit or scope of the invention.

What is claimed is:

1. A lightweight, collapsible apparatus for checking vehicle geometry comprising in combination:
   (a) a pointer bar assembly used as a trammel and for checking toe measurements, comprising a horizontal bar member hinged at the center of its length, a means for vertical support attached by hinges to said horizontal bar member, and a plurality of pointers attached by means for sliding to said horizontal bar member, said pointers being perpendicular to said horizontal bar member in a direction opposite said means for vertical support; and
   (b) an adjustable square bar assembly for providing a reference line perpendicular to a vehicle frame comprising a straight bar member hinged at the center of its length, and a plurality of reference bars perpendicularly attached to said straight bar member so that T's are formed.

2. A lightweight, collapsible apparatus for checking vehicle geometry as described in claim 1, wherein said horizontal bar member, said means for vertical support, said pointers, said straight bar member, and said reference bar members are of hollow tubular construction.

3. A lightweight, collapsible apparatus for checking vehicle geometry as described in claim 2 further comprising means for locking the hinged portions of said horizontal bar member and said straight bar member in place when the apparatus is assembled and ready for use.

4. A lightweight, collapsible apparatus for checking vehicle geometry as described in claim 3, wherein the ends of said pointers most distant from said horizontal bar member come to a point to fit into the center holes of the axle hubs of a vehicle when said pointer bar assembly is used as a trammel.

5. A lightweight, collapsible apparatus for checking vehicle geometry as described in claim 4, further comprising a plurality of bubble levels, with one bubble level attached by detachable means for attachment to each of said pointers.

6. A lightweight, collapsible apparatus for checking vehicle geometry as described in claim 5, wherein the means for sliding which attaches said pointers to said horizontal bar member and said reference bar members to said straight bar member are collars having set screws protruding through them, so that said pointers and said reference bar members can be secured in place in desired locations.

* * * * *